Aug. 7, 1928.
H. J. MURPHY
1,679,736
LUBRICATING APPARATUS
Filed March 14, 1922
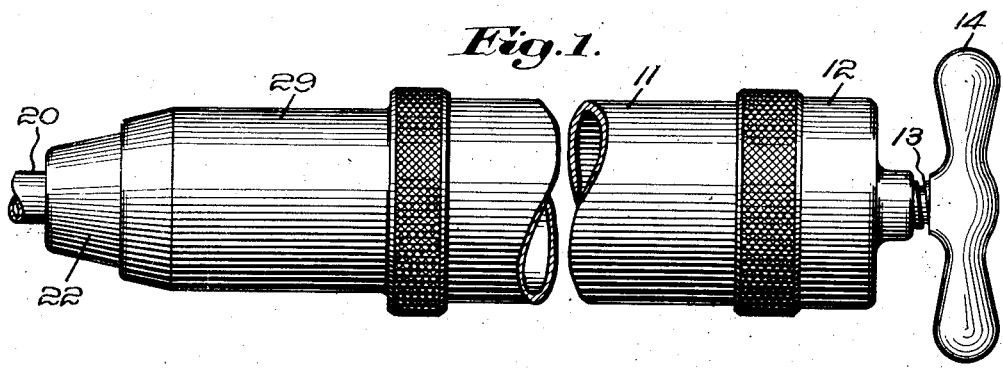
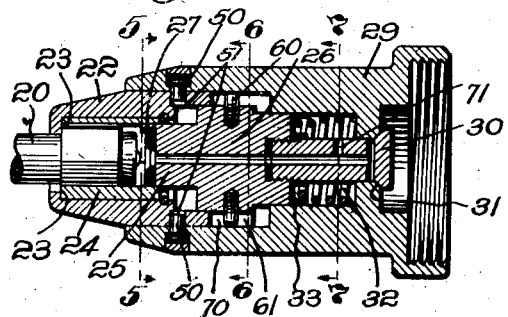 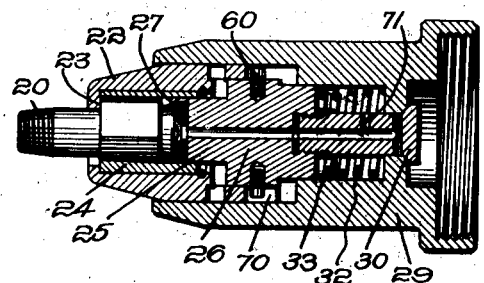
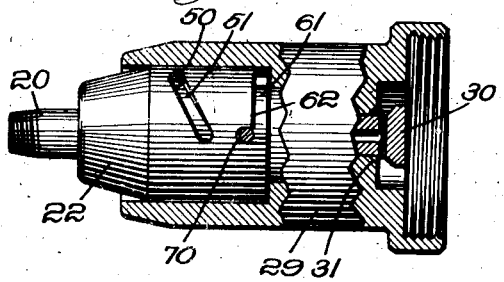 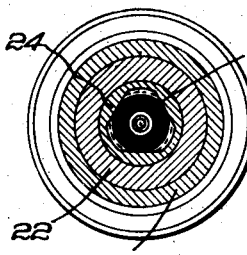 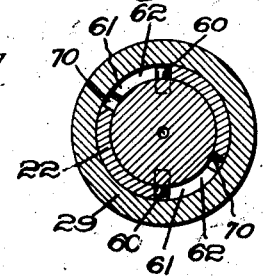
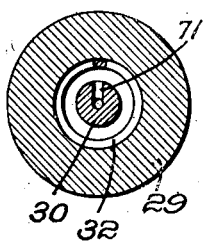 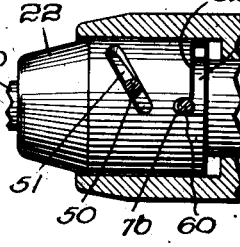 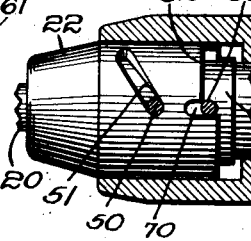 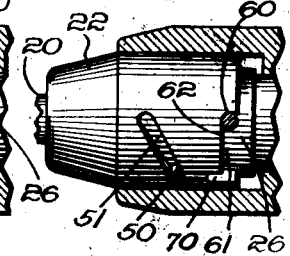
Inventor:
Howard J. Murphy.
By Emery Booth Janney & Varney Attys.

Patented Aug. 7, 1928.

1,679,736

UNITED STATES PATENT OFFICE.

HOWARD J. MURPHY, OF READING, MASSACHUSETTS, ASSIGNOR, BY MESNE ASSIGNMENTS, TO THE BASSICK MANUFACTURING COMPANY, OF CHICAGO, ILLINOIS, A CORPORATION OF DELAWARE.

LUBRICATING APPARATUS.

Application filed March 14, 1922. Serial No. 543,657.

This invention pertains to improvements in lubricating apparatus. It is among the objects of the invention to provide a simple and efficient means for coupling and uncoupling a source of lubricant under pressure relative to lubricant receiving elements.

In the drawings, which show one illustrative embodiment of a preferred form of my invention:—

Figure 1 is a side elevation of a lubricant gun;

Fig. 2 is a central longitudinal section through the discharge end of the gun illustrated in Fig. 1, being partly in elevation and showing the parts in uncoupled relation;

Fig. 3 is a section like Fig. 2, but shows the parts in coupled relation prior to opening of a valve to supply lubricant therethrough;

Fig. 4 is a view similar to Figs. 2 and 3, but more in elevation and showing the coupling complete and the valve opened;

Fig. 5 is a section on the line 5—5 of Fig. 2;

Fig. 6 is a section on the line 6—6 of Fig. 2;

Fig. 7 is a section on the line 7—7 of Fig. 2;

Fig. 8 is a view similar to Fig. 4, but showing the relation of the operating parts pursuant to coupling but prior to opening of the valve;

Fig. 9 is a view similar to Figs. 4 and 8, but showing the relation of the operating parts in uncoupled relation as in Fig. 2; and Fig. 10 is a view similar to Figs. 4, 8 and 9, but showing the relation of the operating parts pursuant to uncoupling, in which position the lubricant receiving part and the source of lubricant may be separated.

Referring to the drawings, I have shown a source of lubricant under pressure typified by a lubricant gun including a barrel 11 having a rear head 12 into which is threaded the usual stem 13 carrying at its outer end the handle 14 and at its inner end a lubricant-expelling piston of usual construction.

At the discharge end of the gun, I preferably provide a coupling cooperating with valve mechanism.

In the preferred form of my invention illustrated, a lubricant-receiving nipple 20 of the form illustrated in my co-pending application Serial No. 543,654 filed herewith is provided, adjacent the lubricant-receiving end thereof, with projecting portions, herein shown as three in number and provided by a portion of the nipple generally triangular in cross-section.

The preferred form of coupling illustrated comprises a retractile coupling part, herein shown as a sleeve 22 having an opening in the end thereof to receive the triangular portion of the nipple and providing shoulders 23, which may underlie the projections on the nipple when turned relative thereto. Within the coupling part 22, I have shown a connecting sleeve 24 which can turn relative to the coupling part 22 and which is longitudinally apertured to receive and fit the triangular part of the nipple and to receive and slidably fit a similarly shaped end 25 of a sealing part 26 carrying a sealing washer 27.

In the preferred form of my invention illustrated, the sealing part 26 is reciprocable relative to the front head 29 of the gun and relative to the barrel 11 to permit opening and closing of a valve 30 carried by the sealing part 26 and reciprocable therewith relative to its seat 31, which may conveniently be carried by or integral with the front head 29 of the gun. A spring 32 urges the sealing part 26 forwarlly and hence urges the valve 30 toward its closed position.

This spring 32 may if desired, as illustrated, press toward its seat a sealing washer 33, shown as cup-shaped, and opposing leakage between the sealing part 26 and the part 29.

The operating means for the coupling and valve in the preferred form of my invention illustrated comprise inclined means between the coupling sleeve 22 and a part which may be stationary relative to the barrel 11 of the gun, such part herein shown as an extension from the head 29 presenting pins 50, 50 entering similar inclined slots 51, 51 in the coupling sleeve 22.

When the nipple 20 is entered in the coupling, any turning of the sealing part 26 is opposed by the connecting sleeve 24. To limit turning of the coupling sleeve 22 and head 29 relative to the sealing part 26, I have provided stop means between the sealing part 26 and the coupling sleeve 22, such stop means taking the form of pins 60, 60 projecting from the sealing part and adapted to bear against stop surfaces at the ends of a slot or recess 61 in the coupling sleeve 22.

This slot or recess may also serve to oppose tightening of the coupling before the coupling sleeve 22 has turned sufficiently relative to the nipple 20, and conversely to oppose turning of the coupling sleeve 22 relative to said nipple 20 prior to loosening of the coupling during the disconnecting operation. To this end the surface 62 of the slot is positioned to preclude rearward movement of the coupling sleeve 22 relative to the sealing part 26 until after sufficient turning movement therebetween has been effected to bring the pins 60, 60 from the position relative to the sleeve 22 illustrated in Fig. 10 to the position illustrated in Fig. 9, after which the indent 70 permits riding of the pins 50, 50 down their cooperating slots 51, 51 to the position shown in Fig. 8, where a tight seal will have been provided by pressure of the sealing washer 27 against the lubricant-receiving face of the nipple 20. During this sealing or tightening operation, the coupling sleeve 22 will have been retracted without turning and the lips 23 will have been pressed against the shoulders behind the projections on the nipple 20.

Further turning of the barrel in clockwise direction will cause the pins 50, 50 to move further down the slots 51, drawing forward the head 29 and consequently the valve seat, thus opening the valve against the pressure of the spring 32.

When the bearing has been lubricated to the desired extent, the head 29 may be turned in a counter-clockwise direction by so turning the barrel. This will first pull the head 29 rearwardly, closing the valve by movement of the pin and slot into the relative position shown in Fig. 8, and then the seal will be released by forward movement of the coupling sleeve 22 and the pins and cooperating slots will assume the relative position shown in Fig. 9. Further turning of the barrel will turn the coupling sleeve 22 relative to the nipple 20 and permit withdrawal of the coupling sleeve from over the head of the nipple 20.

If during the valve-closing movement or at any other time, lubricant should fill the chamber containing the spring 32, such lubricant may during the subsequent opening of the valve either be crowded back around the valve stem or preferably, where a port 70' is provided, opening communication between said chamber and the passage for carrying lubricant to the nipple 20. There will be no tendency for the lubricant to escape from this chamber except when the valve is being opened, and at this time a tight seal is always provided so no leakage can take place. Because the chamber containing the spring 32 is enlarged prior to uncoupling, no pressure is maintained on any lubricant contained therein pursuant to uncoupling.

While I have shown and described a preferred embodiment of my invention, it will be understood that major changes involving omission, alteration, rearrangement and substitution of parts may be made without departing from the scope of my invention, which is best defined by the following claims.

I claim:

1. Lubricating apparatus including a source of lubricant under pressure presenting a discharge terminal having a coupling including a retractile coupling sleeve and a sealing part retractable by retraction of said sleeve when a lubricant-receiving nipple is entered therein, and detent means positively opposing retraction of said sealing part until a nipple is entered in said coupling and said sleeve is turned relative thereto.

2. Lubricating apparatus including a lubricant supply device presenting a coupling and a valve, unitary inclined means for actuating said coupling and said valve, and unyielding detent means positively opposing operation of said inclined means during coupling until a predetermined relative turning movement of said coupling relative to said element has been effected.

3. Lubricating apparatus including a lubricant supply device presenting a coupling and a valve, unitary inclined means for actuating said coupling and said valve, and unyielding detent means providing on uncoupling for positive operation of said inclined means prior to relative turning movement between said coupling and a lubricant-receiving element.

4. Lubricating apparatus including a lubricant gun having a coupling for engagement with a lubricant-receiving nipple, a sleeve surrounding said coupling, tightening means operable by rotation of said sleeve relative to the nipple and coupling when engaged, and means positively preventing operation of the tightening means until said coupling has been turned to a limited extent relative to the lubricant-receiving nipple.

5. Lubricating apparatus including a lubricant supply device presenting a coupling and a valve and unitary inclined means for actuating said coupling and said valve, and unyielding detent means operatively disposed between said valve and said coupling to prevent operation of said valve prior to initial coupling of said coupling with a lubricant-receiving nipple.

6. Lubricating apparatus including a lubricant gun having associated therewith a sealing part, a valve disposed rearwardly of said sealing part, a sleeve for coupling engagement with a nipple, said sleeve movable axially relative to said sealing part during coupling operation thereby to provide a tight seal, coordinate means for preventing turning of the sealing part relative to the nipple when said coupling sleeve is engaged with the nipple, a second sleeve slidable relative to said first mentioned sleeve and sealing part to open said valve and means for positively preventing any axial movement of said second sleeve until after sealing has taken place.

7. Lubricating apparatus including a lubricant gun having associated therewith a sealing part, a valve disposed rearwardly of said sealing part, a sleeve for coupling engagement with a nipple, said sleeve movable axially relative to said sealing part during coupling operation thereby to provide a tight seal, a second sleeve slidable relative to said first sleeve and sealing part to open said valve after sealing has taken place and operative means between said first sleeve and said second sleeve for positively controlling the sequence of operation so that one sleeve cannot move axially relative to the other until coupling has taken place.

In testimony whereof, I have signed my name to this specification.

HOWARD J. MURPHY.